United States Patent

Sumner et al.

[11] Patent Number: 5,857,018
[45] Date of Patent: *Jan. 5, 1999

[54] AUTOMATIC CALL DISTRIBUTOR WITH PRIORITIZATION

[75] Inventors: Roger A. Sumner, Batavia; Thomas S. Holtaway, Glen Ellyn; John P. Lenihan, Wheaton; Daniel F. Baker, Rolling Meadows, all of Ill.

[73] Assignee: Rockwell International Corp., Costa Mesa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 938,040

[22] Filed: Sep. 26, 1997

Related U.S. Application Data

[63] Continuation of Ser. No. 752,707, Nov. 19, 1996, abandoned, which is a continuation-in-part of Ser. No. 375,322, Jan. 18, 1995, abandoned, which is a continuation-in-part of Ser. No. 264,114, Jun. 22, 1994, abandoned, which is a continuation of Ser. No. 928,860, Aug. 11, 1992, abandoned.

[51] Int. Cl.⁶ ..................................................... H04Q 3/64
[52] U.S. Cl. ........................... 379/266; 379/243; 379/265; 379/309
[58] Field of Search .................................... 379/265, 266, 379/309, 112, 113, 114, 115, 242, 243, 244

[56] References Cited

U.S. PATENT DOCUMENTS

| | | | |
|---|---|---|---|
| 4,694,483 | 9/1987 | Cheung | 379/265 |
| 4,757,529 | 7/1988 | Glapa et al. | 379/266 |
| 4,953,204 | 8/1990 | Cuschleg, Jr. et al. | 379/266 |
| 4,995,075 | 2/1991 | Angiolillo-Bent et al. | 379/375 |
| 5,134,652 | 7/1992 | Brown et al. | 379/309 |
| 5,546,454 | 8/1996 | Harrington | 379/265 |
| 5,592,542 | 1/1997 | Honda et al. | 379/266 |
| 5,715,306 | 2/1998 | Sunderman et al. | 379/113 |

FOREIGN PATENT DOCUMENTS

| | | |
|---|---|---|
| 57-111170 A | 7/1982 | Japan . |
| 51-184035 A | 8/1986 | Japan . |
| 62-200956 A | 9/1987 | Japan . |

*Primary Examiner*—Harry S. Hong
*Assistant Examiner*—Scott Wolinsky
*Attorney, Agent, or Firm*—Welsh & Katz, Ltd.

[57] ABSTRACT

An automatic call distributor (ACD) for routing application, external position and internal position telephone calls to one of a plurality of agents is disclosed. Priority levels of the different types of calls are selectively assigned for each individual agent and can be changed as desired. When a plurality of incoming calls having different call types are received concurrently for a particular agent, the call of the call type having the highest priority as determined for the particular agent is connected to the particular agent first.

9 Claims, 3 Drawing Sheets

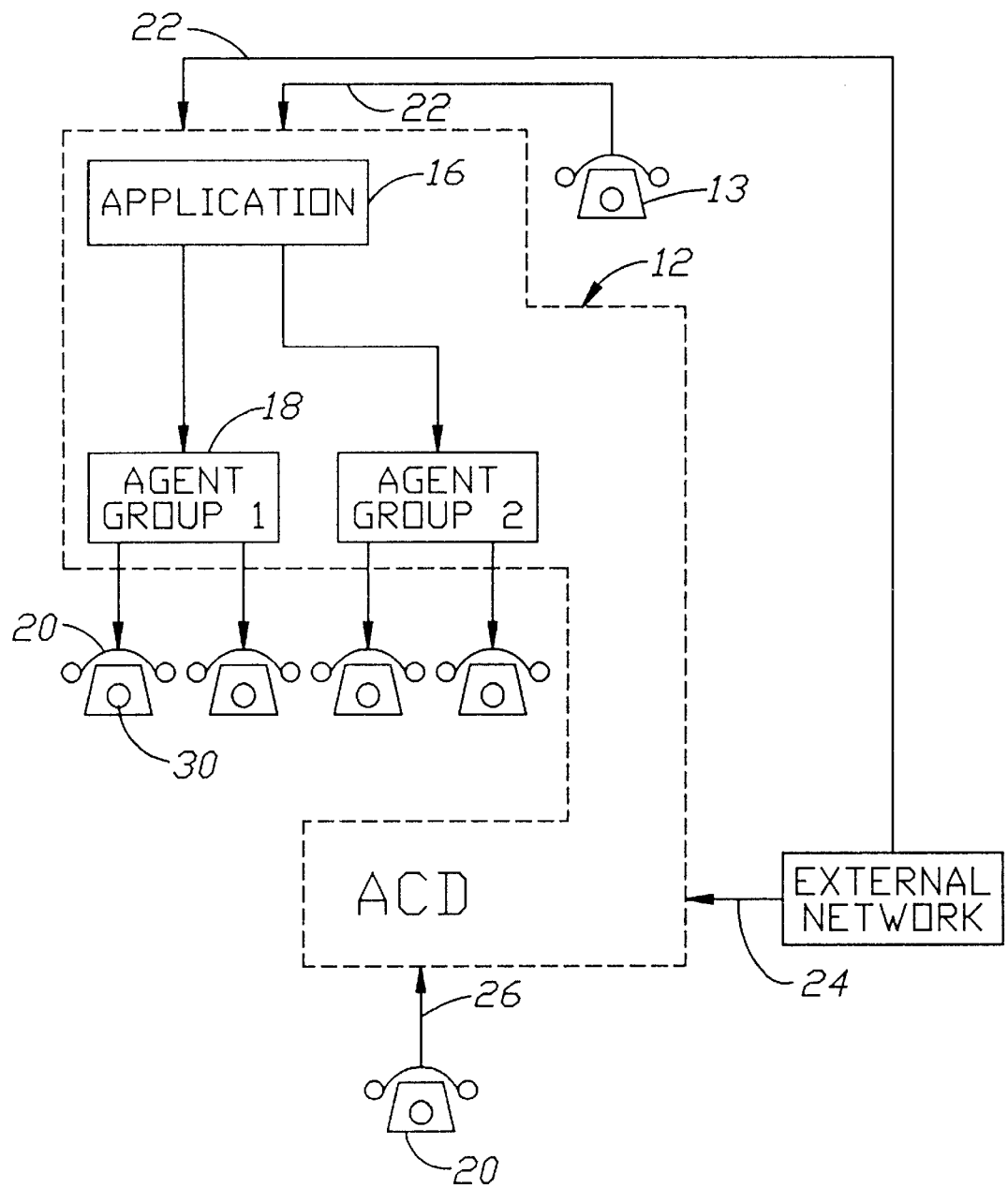

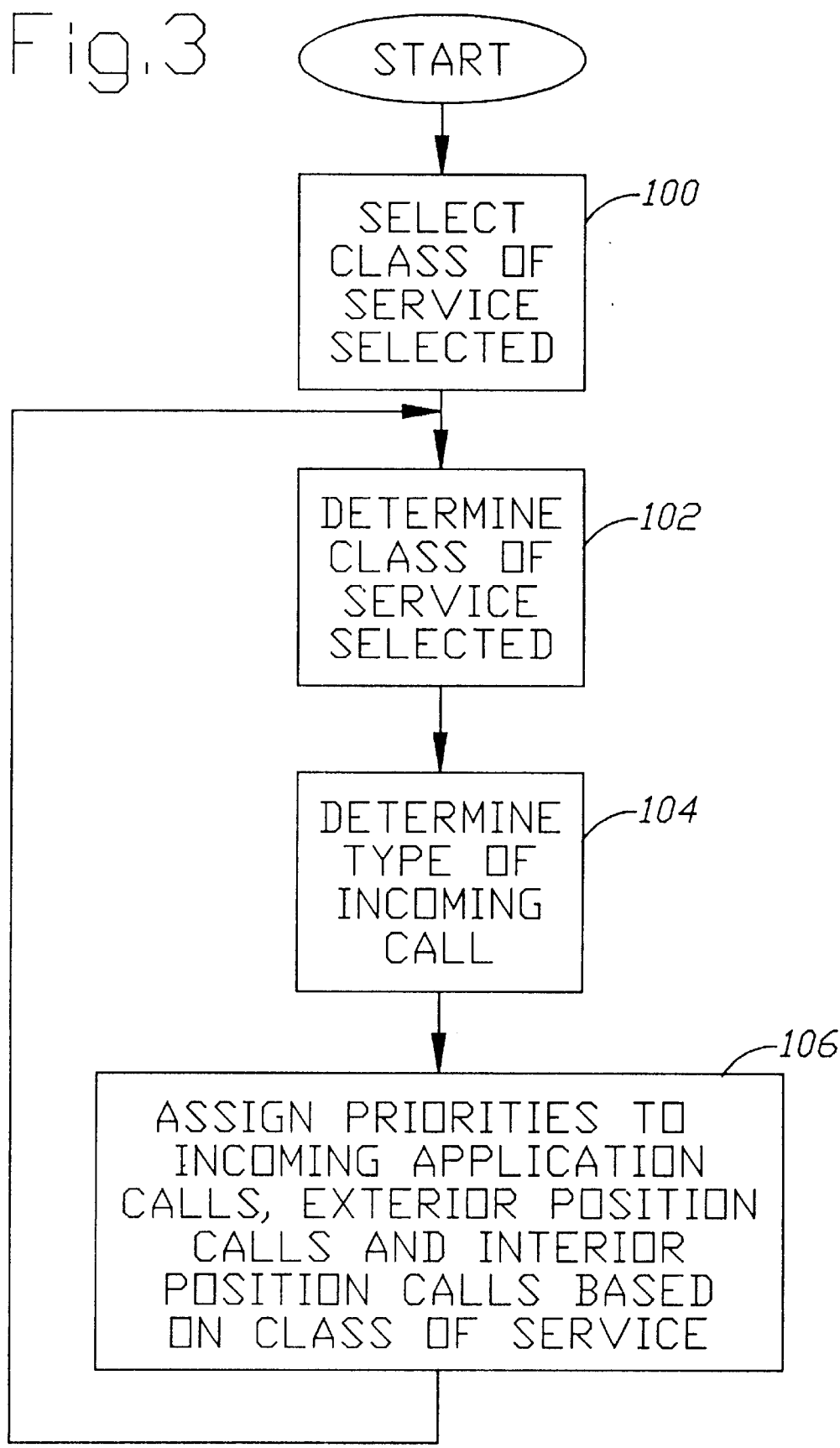

AUTOMATIC CALL DISTRIBUTOR WITH PRIORITIZATION

CROSS-REFERENCES TO RELATED APPLICATIONS

This is a continuation continuation of application Ser. No. 08/752,707, filed Nov. 19, 1996, now abandoned, which is a continuation-in-part of application Ser. No. 08/375,322, filed Jan. 18, 1995, now abandoned, which is a continuation-in-part of application Ser. No. 08/264,114, filed Jun. 22, 1994, now abandoned, which is a continuation of application Ser. No. 07/928,860, filed Aug. 11, 1992, now abandoned.

BACKGROUND OF THE INVENTION

The present invention relates to automatic call distributors in a telephone system.

In the past, automatic call distributors (ACD) have been known to route calls to a number of agents in a telephone system. In such call distributors, the telephone system recognized application calls originating from the outside which are directed to any one of a plurality of agents on a basis when the agents are most available, and position calls which are made directly to a particular agent. However, no distinction has been made between position calls to the particular agent which originated outside the ACD and position calls which originated inside the ACD, nor were the position calls prioritized.

As a result, the agent may have to handle a plurality of low priority calls before handling calls of higher priority which should have been handled earlier, resulting in inconvenience to the callers and inefficiency of the system.

SUMMARY OF THE INVENTION

A feature of the present invention is the provision of an improved automatic call distributor.

The distributor of the present invention comprises, means for routing an application telephone call to an available agent, means for routing an exterior position call directly to an agent, and means for routing an interior position call directly to a particular agent.

A feature of the present invention is the provision of means for determining a desired priority of the application, external position, and internal position calls to the particular agent.

Yet another feature of the invention is the provision of means for connecting the prioritized calls to the particular agent in the determined priority.

Thus, a feature of the invention is that the distributor distributes the calls in an improved manner.

Still another feature of the invention is that the distributor distributes the position calls with greater speed and efficiency.

Another feature of the invention is that the particular agent may handle the calls in a desired priority.

A further feature of the invention is that the user may select the priority of the application, exterior position, and internal position calls.

Thus, a feature of the invention is that the user has increased control over the telephone system in order to improve operation of the system.

Further features will become more fully apparent in the following description of the embodiments of this invention, and from the appended claims.

DESCRIPTION OF THE DRAWINGS

In the drawings:

FIG. 2 is a block diagram of the automatic call distributor of the invention.

FIG. 3 is a flow chart illustrating the preferred procedural steps for assigning priorities for application calls, exterior position calls and interior position calls received at the automatic call distributor of FIG. 1 in the present invention.

DESCRIPTION OF THE PREFERRED EMBODIMENTS

Figure 1:
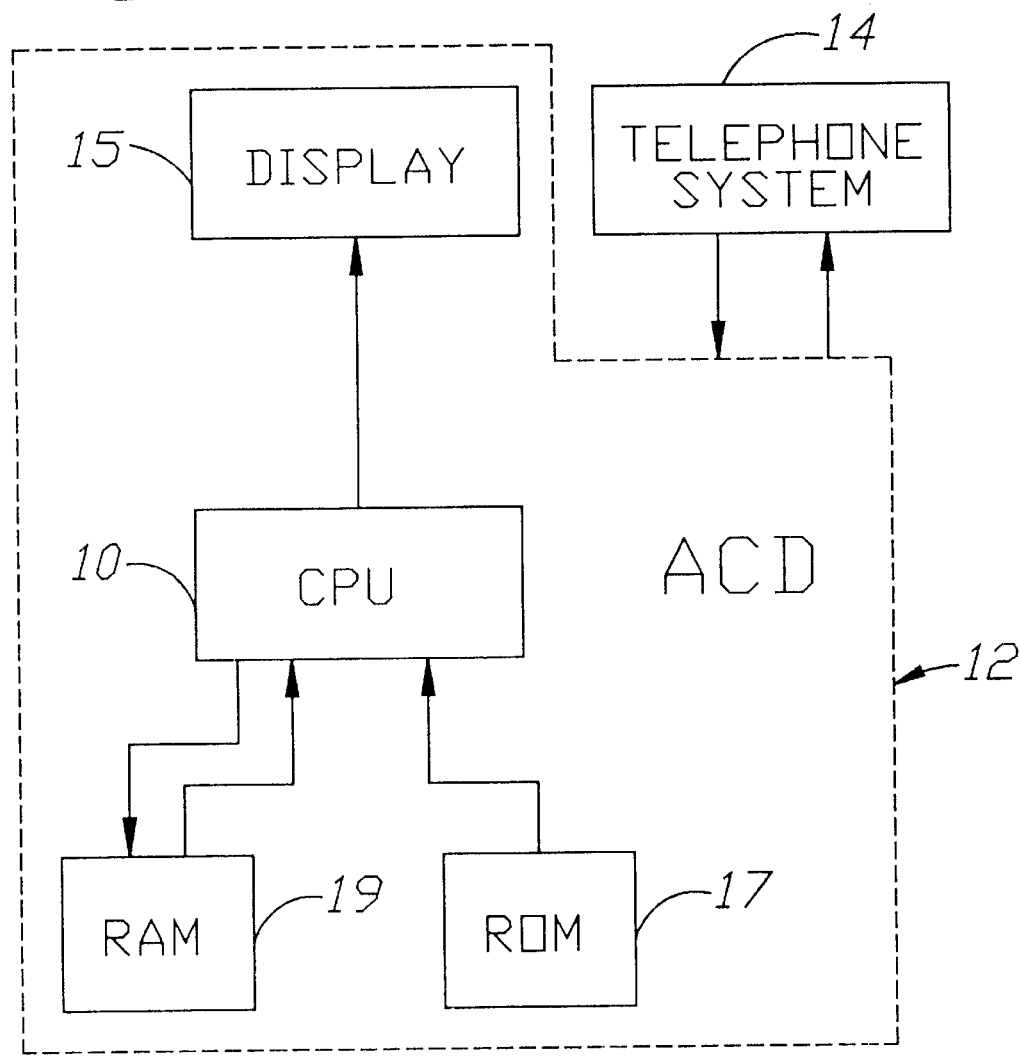
FIG. 1 is a block diagram of an automatic call distribution system coupled to a telephone system in accordance with an embodiment of the invention.

Referring now to FIG. 1, there is shown a computer or Central Processing Unit (CPU) generally designated 10 for an Automatic Call Distributor (ACD) generally designated 12 connected to a telephone system generally designated 14. The CPU or computer 10 has a Random Access Memory (RAM) 19 and a Read Only Memory (ROM) 17, and a suitable program is filled into the memory 17 of the computer 10 in order to control the ACD. The CPU may have a suitable display 15 for monitoring various calls in the telephone system 14.

With reference to FIG. 2, the ACD 12 has a switch 11 comprising an application 16 to receive and direct application calls (e.g., received on telephone signal paths 22 and 24) originating outside or inside e.g., from telephones 13 or 20F the ACD to a plurality of agent groups 18, with the agent groups further directing the application calls to a plurality of agents 20A–20D corresponding to each of the agent groups 18. Application calls are received at the automatic call distributor 12 from both an internal telephone 20E or 20F at which an agent is stationed or from customers calling from external telephones 13 through telephone system 14. An application call is a general purpose call associated with an application program 16 stored in the Random Access Memory 19, FIG. 1, of the automatic call distributor 12, FIG. 2. The program scripts of the application program 16 specify the manner in which the automatic call distributor 12 handles the received call associated with the particular application. Preferably, the application program 16 directs the application call to a group of agents 18 in which each of the plurality of agents 20A–20D are placed in queue for service of the call by any of the plurality of agents in accordance with the defined application. In the usual form, the application calls are directed to any agent 20A–20D who is idle to handle the call, and the application calls are also placed in a waiting line (i.e., queue) for handling for a particular agent 20A a until such time at which the agent 20A may handle the call. The internal and external position calls are also placed in a waiting line.

In addition, the telephone system 14 and ACD 12 may handle exterior position calls (e.g., arriving on telephone signal path 24) which originate from outside the ACD 12, and which are directed to a particular agent handling the calls. Preferably, an exterior or external position call is a call received through the external telephonic network in which the extension number of a particular agent 20 is dialed for routing of the call by the automatic call distributor directly to an agent position identified by the extension number. The ACD 12 also handles interior position calls (e.g., arriving on ACD signal path 26 or 28) which originate from one agent 20E within the ACD 12 to the particular agent 20. Interior position calls are preferably calls made in which an agent at an agent telephone 20 at the automatic call distributor 12 location dials the specific extension number of another agent internally positioned at the automatic call distributor. The ACD 12 routes an interior position call from the one agent position 20 to the other identified agent position. Thus, any agent 20 may receive an application call, an exterior position call, or an interior position call. Such calls are received and routed by the ACD 12 to the particular agent.

In accordance with the present invention, a priority may be assigned by the user in a memory table termed Class of Service stored in the RAM 19, FIG. 1, of the program in the computer 10 for the incoming application calls, the incoming exterior position calls, and the interior position calls. The user enters a class of service command at the display 15, FIG. 1, coupled with the central processing unit 10 and receives a class of service table identifying the assigned call handling parameters for each agent 20. The user is enabled to selectively assign and change a numeric priority level for application calls, exterior position calls and interior position calls stored in the class of service table in the memory of the automatic call distributor 12. Either one of these types of calls may be assigned a first highest priority, another type of these calls may be assigned a second moderate priority, and the final type of these calls may be assigned a lowest priority. In this manner, the user may define the priorities of the calls to provide improved efficiency and speed of the ACD 12, and to verify that the various agents 20 are handling the particular calls in the desired priority and manner. The agents 20 may also have a suitable switch or toggle 30 to indicate to the computer 10 when the agent 20 is available or unavailable for receiving a call automatically.

Referring now to FIG. 3, the procedure for assigning various priorities to corresponding application, external position and internal position calls received at the ACD 12, begins at step 100 by the user selecting a class of service in the memory 19, FIG. 1, of the computer 10 and associating different priority levels for each of the types of incoming calls. In step 102, FIG. 3, the computer 10 determines the class of service parameters selected for the particular agent 20 receiving an incoming call. In step 104, FIG. 3, the computer 10, FIG. 1, of the ACD 12 determines the type of incoming call (i.e. application call, interior position call, exterior position call). In step 106, FIG. 3, the computer 10, FIG. 1, assigns the priorities to incoming application calls, exterior position calls and interior position calls based on the designated priority level for each type of call in the class of service table memory for the agent receiving the call.

The foregoing detailed description has been given for clearness of understanding only, and no unnecessary limitations should be understood therefrom, as modifications will be obvious to those skilled in the art.

What is claimed is:

1. An automatic call distributor, comprising:

means for receiving an application telephone call and routing the received application call to one of a plurality of agents;

means for routing an external position call directly to one of said agents;

means for routing an internal position call directly to one of said agents;

means for selectively changing call type priority levels of application, external position, and internal position calls for a particular agent; and means responsive to concurrent application, external position, and internal position calls incoming to the particular agent and to said changed priority levels for routing one of said application, external position, and internal position calls having a first highest relative priority to the particular agent.

2. The distributor of claim 1 wherein the external and internal position calls are placed in separate lines of incoming calls with priority levels being separately assigned to the position calls dependent upon the line on which they are waiting.

3. The distributor of claim 1 wherein position calls are prioritized with respect to application calls.

4. The distributor of claim 1 wherein application calls are distributed among said plurality of agents.

5. The distributor of claim 1 including means for determining the availability of the particular agent.

6. The distributor of claim 1 including means for selecting the priority levels of the application, external position, and internal position calls.

7. The distributor of claim 1 including means for assigning a different priority of distribution to the particular agent for each of the different call types of application calls, external position calls and internal position calls.

8. The distributor of claim 7 in which the assigning means includes means for selectively assigning a highest priority for application calls, a moderate priority for internal position calls and a lowest priority for external position calls.

9. The distributor of claim 7 in which the assigning means includes means for selectively assigning a highest priority for one of the types of application, external position and internal position calls, a moderate priority for another of the types of application, external position, and internal position calls, and a third lowest priority for a third type of the application, external position and internal position calls.

* * * * *